United States Patent
Grünewald et al.

(10) Patent No.: US 6,488,742 B1
(45) Date of Patent: *Dec. 3, 2002

(54) METHOD FOR REGENERATING A LOADED WASH LIQUID FROM A GAS DESULFURIZATION FACILITY

(75) Inventors: Gerhard Grünewald, Mainz; Uwe Zwiefelhofer, Neu-Anspach, both of (DE)

(73) Assignee: Metallgesellschaft AG, Frankfurt am Main (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/402,075
(22) PCT Filed: Apr. 2, 1998
(86) PCT No.: PCT/EP98/01910
  § 371 (c)(1),
  (2), (4) Date: Dec. 6, 1999
(87) PCT Pub. No.: WO98/47602
  PCT Pub. Date: Oct. 29, 1998

(30) Foreign Application Priority Data

Apr. 18, 1997 (DE) .......................................... 197 16 310

(51) Int. Cl.⁷ ............................................. B01D 53/14
(52) U.S. Cl. .............................. 95/173; 95/174; 95/189; 95/192; 95/197; 95/205; 95/234; 95/235; 95/236

(58) Field of Search ........................... 95/160, 163, 165, 95/166, 172, 173, 174, 176, 177, 178, 179, 181, 183, 189, 192, 193, 194, 195, 197, 198, 205, 235, 236, 234

(56) References Cited

U.S. PATENT DOCUMENTS

| | | | | |
|---|---|---|---|---|
| 3,688,474 A | * | 9/1972 | Head et al. ..................... | 95/193 |
| 3,989,811 A | * | 11/1976 | Hill ............................... | 95/166 |
| 4,142,875 A | | 3/1979 | Bohmholdt et al. | |
| 4,478,799 A | | 10/1984 | Bengeser et al. | |
| 4,492,676 A | * | 1/1985 | Baur et al. ..................... | 95/174 |
| 5,085,675 A | | 2/1992 | Kriebel et al. | |

FOREIGN PATENT DOCUMENTS

| | | |
|---|---|---|
| DE | 31 48 519 A | 7/1983 |
| DE | 37 18 457 A | 12/1988 |
| EP | 0 081 241 A | 6/1983 |
| FR | 2 344 624 A | 10/1977 |

* cited by examiner

Primary Examiner—Duane S. Smith
(74) Attorney, Agent, or Firm—Norris McLaughlin & Marcus

(57) ABSTRACT

Process for the removal of metal cabonyls before regeneration of a desulfurization wash liquid, which includes removing a part of the carbon monoxide from the wash liquid, conversion of the metal carbonyls to metal sulfides, passing the wash liquid through a reaction and settling zone, removing metal sulfide-containing sludge from the reaction and settling zone, and regenerating the wash liquid.

4 Claims, 2 Drawing Sheets

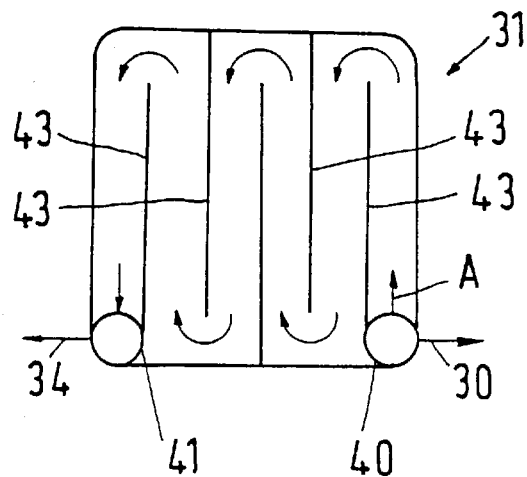
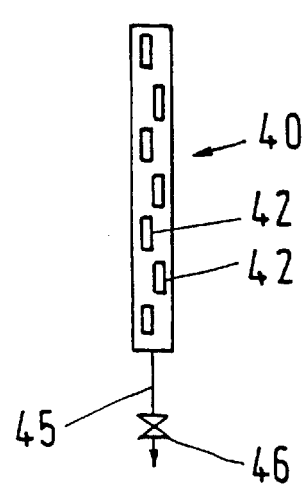
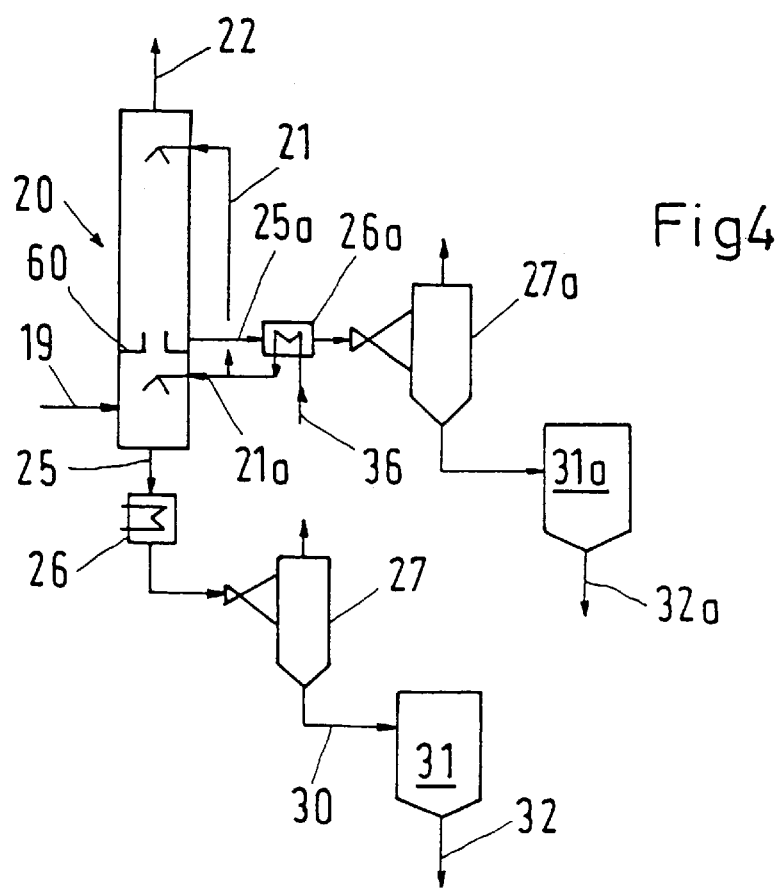

METHOD FOR REGENERATING A LOADED WASH LIQUID FROM A GAS DESULFURIZATION FACILITY

DESCRIPTION

This invention relates to a process of regenerating a loaded washing liquid which comes from a plant for desulfurizing a gas mixture containing hydrogen and carbon oxides and as load contains $H_2S$, CO, $H_2$, $CO_2$, and nickel carbonyl and/or iron carbonyl, where the washing liquid is reused for desulfurizing after a hot regeneration.

BACKGROUND OF THE INVENTION

Desulfurizing processes and the associated regeneration of loaded washing liquids are known and described for instance in the German patent 39 22 785 and in the corresponding U.S. Pat. No. 5,085,675. The regeneration of the loaded washing liquids is effected in a known manner by means of one or several of the measures expanding, stripping and heating, where it is also possible to perform two or three of those measures at the same time in one container.

BRIEF SUMMARY OF THE INVENTION

In particular when using physically acting washing liquids, metal carbonyls may lead to problems during the regeneration, as they are converted to sulfides during the heating of the washing agent and form undesired deposits. These carbonyls chiefly include nickel carbonyls, e.g. $Ni(CO)_4$, and iron carbonyls, in particular $Fe(CO)_5$. It is therefore the object underlying the invention to convert the metal carbonyls to sulfides at an appropriate point and remove them from the washing liquid to such an extent that difficulties in the desulfurizing plant and in subsequent plants are avoided. In accordance with the invention this is achieved in the above-mentioned process in that carbon monoxide is at least partly removed from the loaded washing liquid, the washing liquid poor in CO is passed through a reaction and settling zone, a sludge containing nickel sulfide and/or iron sulfide is withdrawn from the reaction and settling zone, and the washing liquid is supplied to the hot regeneration.

DETAILED DESCRIPTION

In the nickel carbonyls and iron carbonyls the CO is coordinatively bound to the metal atom, so that the carbonyls are converted to sulfides (NiS or FeS) in the loaded washing liquid, as soon as the CO is at least partly removed from the washing liquid. This removal of CO can be effected in various ways, and in particular by means of expanding and/or stripping the washing liquid. The temperature of the loaded washing liquid should favorably be increased, for example, by means of an indirect or direct heat exchange with hot-regenerated washing liquid prior to the removal of CO.

Usually, the desulfurization is effected at a pressure in the range from 10 to 100 bar, so that before the reaction and settling zone the loaded washing liquid can easily be expanded by a pressure difference of at least 3 bar, where a CO-containing expansion gas is released. After this release of CO, the nickel carbonyls and iron carbonyls in the washing solution are gradually converted to insoluble sulfides. It may be expedient to wash the released expansion gas with regenerated washing liquid, so as to keep carbonyls in solution.

Preferably, the pressure in the reaction and settling zone lies in the range from 1 to 20 bar and mostly around at least 3 bar, the temperature usually lies in the range from 0 to 150° C. and preferably around at least 40° C. Advantageously, it should be ensured that the $H_2S$ contained in the loaded washing liquid and also the $CO_2$ are not, or possibly only to a minor extent, released in the reaction and settling zone and only the nickel sulfides and/or iron sulfides are precipitated there. It is therefore expedient to keep the pressure in the reaction and settling zone higher than in the hot regeneration.

To achieve an optimum separation of the metal sulfides from the washing liquid in the reaction and settling zone it is recommended to pass the washing liquid through the reaction and settling zone with a sufficient dwell time, and move the washing liquid as slowly as possible, so that the sulfides can gradually settle. For nickel carbonyls, dwell times in the range from 5 to 80 minutes and mostly 15 to 60 minutes are usually sufficient, whereas iron carbonyls require dwell times of about 1 to 10 hours, preferably at least 3 hours.

The process in accordance with the invention is suited for the treatment of different washing liquids, e.g. methanol, N-methylpyrrolidone (NMP) or dimethyl ether of polyethylene glycol (DMPEG). Usually, these are physically acting washing liquids. The gas mixture to be desulfurized comes from the gasification of solid or liquid carbonaceous materials, e.g. heavy oil, coal, petroleum coke, hydrocarbons containing asphalt, distillation residues or mixtures of these materials. The gasification is effected in a known manner by means of a partial oxidation with air, with oxygen-enriched air or with technically pure oxygen, and mostly by adding steam.

BRIEF DESCRIPTION OF THE DRAWINGS

Embodiments of the process will be explained with reference to the drawing, wherein:

FIG. 2 shows a horizontal section along line I—I through the reaction and settling vessel of FIG. 1 in an enlarged representation, FIG. 3 shows the view of the inlet pipe of the reaction and settling vessel of FIGS. 1 and 2, viewed opposite to the direction of the arrow A in FIG. 2, and FIG. 4 shows a variant of the flow diagram of FIG. 1.

DETAILED DESCRIPTION OF THE INVENTION

Figure 1:
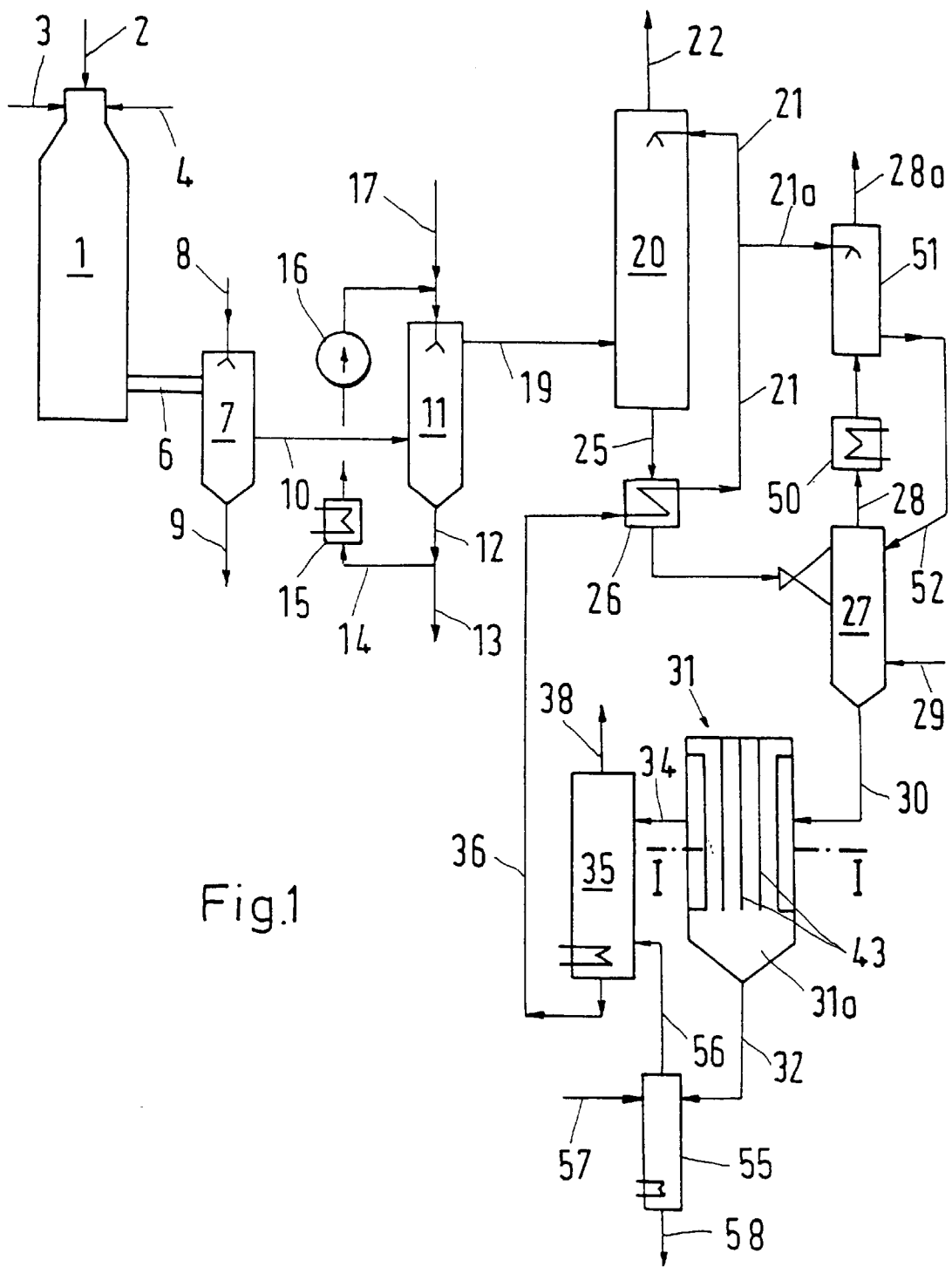
FIG. 1 shows the flow diagram of a plant for treating a gasification raw gas and for regenerating a loaded washing liquid.

The process illustrated in FIG. 1 is based on the fact that a heavy oil is gasified by means of a partial oxidation, but the process in accordance with the invention can also be used in plants for gasifying other solid or liquid materials. Heavy oil is supplied to the empty gasification reactor 1 through line 2, and this heavy oil is gasified with oxygen from line 3 and steam from line 4 at temperatures in the range from 800 to 1400° C. A raw gas containing hydrogen, carbon oxides and soot is obtained, which is passed through the passage 6 into a washer-cooler 7, in which the raw gas is sprayed with water from line 8. Sooty water is withdrawn via line 9. The roughly cleaned raw gas is supplied via line 10 to a spray cooler 11, in which the gas is sprayed with partly circulating water and subjected to further cooling. The water flowing out of the cooler 11 via line 12 is partly removed via line 13, the remaining water is supplied to an indirect cooler 15 through line 14 and is recirculated to the cooler 11 by means of the circulating pump 16. Fresh water comes from line 17.

Through line 19, the gas mixture treated in the spray cooler 11 is supplied to a desulfurization column 20, where in a counterflow with washing liquid from line 21 it is above all largely liberated from $H_2S$. Purified gas is withdrawn via line 22.

The pressure and the temperature in the desulfurization column 20 are appropriately chosen in a known manner adapted to the used washing liquid, where the use of NMP provides for higher temperatures than the use of methanol as washing liquid. Usually, the temperatures in the desulfurization column 20 lie in the range from +60° C. to −60° C., and there is employed a pressure in the range from 10 to 100 bar.

The loaded washing liquid, which is withdrawn from the column 20 via line 25, contains $H_2S$, $CO_2$, CO, $H_2$ and, depending on the metal content in the material to be gasified, also nickel carbonyls and/or iron carbonyls. In the indirect heat exchanger 26 the loaded washing liquid is heated and then expanded into the expansion vessel 27. Expediently, the pressure in the vessel 27 is lower than in the desulfurization column 20 by at least 3 bar and preferably by at least 5 bar.

During the expansion of the loaded washing liquid into the expansion vessel 27 an expansion gas is released, which also contains carbon monoxide. This expansion gas is withdrawn via line 28 and is first passed through the cooler 50 and then through the washing column 51, in order to remove carbonyls released during the expansion. Regenerated washing liquid comes from line 21a and upon usage is delivered to the vessel 27 via line 52. To further increase the expulsion of CO in the vessel 27, it may be advantageous to additionally introduce a stripping gas, e.g. nitrogen or methanol vapor, through line 29 into the lower portion of the expansion vessel 27. Alternatively, such stripping may also be effected in a separate column. The partly expanded washing liquid is then supplied through line 30 to a reaction and settling vessel 31, details of which are represented in FIGS. 2 and 3. In the vessel 31 a sulfide sludge is precipitated, which above all consists of nickel sulfide and/or iron sulfide and is withdrawn via line 32. The washing liquid largely liberated from carbonyls flows from the vessel 31 through line 34 into the hot regeneration 35, where $H_2S$ is removed during the regeneration. In contrast to the simplified representation of FIG. 1, the hot regeneration can also consist of several treatment stages and for instance additionally employ a supply of stripping gas.

Regenerated washing liquid is withdrawn via line 36, is cooled in the indirect heat exchanger 26 and is recirculated through line 21 to the desulfurization column 20 and the column 51. The regeneration exhaust gas, which is produced in line 38 and chiefly consists of $H_2S$, may be supplied to a Claus plant known per se, which is not represented here. Details of the reaction and settling vessel 31 are explained with reference to FIGS. 2 and 3. In this vessel 31 it is ensured that the washing liquid flows from the inlet pipe 40 to the outlet pipe 41, slowly and with a sufficient dwell time. At the same time, a maximum height of the liquid of 2 to 40 m is ensured. To achieve that the sulfides formed can settle in the vessel 31 as unimpededly as possible, the liquid flows horizontally from the inlet pipe 40 through numerous apertures 42, see FIG. 3, first in the direction of the arrow A along a zigzag path formed by partitions 43, see FIG. 3, to the outlet pipe 41. The outlet pipe 41 may likewise be provided with apertures, as is represented in FIG. 3 for the inlet pipe. The liquid arriving in the outlet pipe 41 flows off in the collecting line 34 and is delivered to the hot regeneration 35. During the approximately horizontal flow of the washing liquid from the inlet pipe 40 to the outlet pipe 41 the sulfides formed may settle to the bottom, accumulate in the sump 31a of the vessel 31 (see FIG. 1) and be withdrawn through line 32. To prevent the sulfides from also accumulating in the inlet pipe 40, there is likewise provided a discharge line 45 including a valve 46 (see FIG. 3).

The sulfide sludge settling at the bottom of the vessel 31 is periodically withdrawn through line 32 by opening a valve not represented and is delivered into the heated treatment vessel 55. Vapors of the washing liquid are delivered through line 56 into the hot regeneration 35. If necessary, washing water may be introduced into the vessel 55 through line 57. The sulfide sludge withdrawn via line 58, which now contains less noxious substances, is introduced into a not represented collecting tank.

In the procedure represented in FIG. 4 it is ensured that washing liquid chiefly containing iron carbonyls can be withdrawn at least partly separate from washing liquid chiefly containing nickel carbonyls. For this purpose, the desulfurization column 20, which has already been described in conjunction with FIG. 1, is provided with a gas-permeable bottom 60. The gas mixture entering through line 19 is first of all brought in contact with a partial stream of the regenerated washing liquid, which comes from line 21a. Iron carbonyls are preferably absorbed by the liquid and delivered through the indirect heat exchanger 26, the expansion vessel 27 and line 30 to the reaction and settling vessel 31. In the vessel 31 a relatively long dwell time of 1 to 10 hours and mostly of several hours is ensured, before the sludge containing iron sulfide is withdrawn through line 32. Small amounts of NiS are likewise contained in the sludge in line 32.

The partial amount of used washing liquid, which is withdrawn via line 25a, is delivered through the heat exchanger 26a and the expansion vessel 27a to the second reaction and settling vessel 31a. After a relatively short dwell time of 5 to 80 minutes, a sludge chiefly containing nickel sulfide can then be withdrawn through line 32a.

EXAMPLE

In a procedure in accordance with FIG. 1 raw gas from the gasification of heavy oil is desulfurized. Raw gas is supplied to the desulfurization column 20 in an amount of 6690 kmol/h with the following composition:

| | |
|---|---|
| $CO_2$ | 5.4 mol-% |
| CO | 47.7 mol-% |
| $H_2$ | 45.3 mol-% |
| $CH_4$ | 0.2 mol-% |
| $N_2$ | 0.3 mol-% |
| $H_2S$ | 0.9 mol-% |
| COS | 0.2 mol-% |

This raw gas still contains 1.6 ppmv iron carbonyl and 1.2 ppmv nickel carbonyl. The pressure in the column 20 is 55 bar, and the temperature in the lower portion of the column 20 is about −26° C. Cold methanol is supplied to the column in an amount of 3100 kmol/h as washing liquid.

The loaded washing liquid flowing off via line 25 contains 5.6 mol-% $CO_2$, 1.1 mol-% CO and 0.4 mol-% $H_2$ as well as all sulfur components and carbonyls of the raw gas in dissolved form. With a temperature of 90° C., the washing liquid enters the expansion vessel 27, which operates without supply of stripping gas. The pressure in the vessel 27 is 8 bar. The expansion gas, which leaves the column 51 in an amount of 170 kmol/h via line 28a, contains

| | |
|---|---|
| $CO_2$ | 64.8 mol-% |
| CO | 21.2 mol-% |
| $H_2$ | 7.0 mol-% |
| $H_2S$ | 6.5 mol-% |
| COS | 0.5 mol-% |

This gas had been washed with 125 kmol/h cold methanol from line 21a.

The pressure in the vessel 31 is about 8 bar, and the temperature is 85° C. After a dwell time of 5 hours, the loaded washing liquid is supplied to the hot regenerator 35 via line 34. During the dwell time in the vessel 31, 100% of the nickel carbonyls and 98% of the iron carbonyls are converted to sulfides, which settle down and are withdrawn as sludge.

What is claimed is:

1. A process of regenerating a loaded washing liquid which comes from a plant for desulfurizing a gas mixture containing hydrogen and carbon oxides, at a pressure of 10 to 100 bar and which comprises $H_2S$, CO, $H_2$, $CO_2$, and nickel carbonyl and iron carbonyl, wherein the loaded washing liquid is partly expanded by a pressure difference of not less than 3 bar and a CO-containing expansion gas is released, and wherein metal carbonyls are at least partly converted to metal sulfides and metal sulfides are removed from the washing liquid, the washing liquid is passed through a hot regeneration stage and regenerated washing liquid is reused for desulfurizing, in which the gas mixture containing the hydrogen and carbon oxides a) is contacted with a first partial stream of regenerated washing liquid in a first washing zone to form a stream of loaded washing liquid containing $H_2S$, CO, $H_2$, $CO_2$ and iron carbonyl, and said first stream of loaded washing liquid is withdrawn from the first washing zone, is cooled, partly expanded to release a first CO-containing expansion gas, and a first sludge containing iron sulfide is allowed to settle in a first reaction and settling zone at a dwell time of 1 to 10 hours and sludge is withdrawn and the first stream is routed to the hot regeneration stage and b) that the gas mixture coming from the first washing zone is contacted with a second partial stream of regenerated washing liquid in a second washing zone and a second stream of loaded washing liquid which contains $H_2S$, CO, $H_2$, $CO_2$ and nickel carbonyl is withdrawn from the second washing zone, the second steam is cooled, partly expanded and a second CO-containing expansion gas is released, a second sludge containing nickel sulfide is allowed to settle in a second reaction and settling zone at a dwell time of 5 to 80 minutes and sludge is withdrawn and the second stream is routed to the hot regeneration stage.

2. The process of claim 1, wherein the pressure in the reaction and settling zones lies in the range from 1 to 20 bar.

3. The process of claim 1, wherein the temperature in the reaction and settling zones lies in the range from 0 to 150° C.

4. The process of claim 1, wherein the maximum liquid level in the reaction and settling zones is 2 to 40 m.

* * * * *